DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 9, 1970

875 O.G. 342

T875,013
SUPERSENSITIZED SILVER HALIDE PHOTOGRAPHIC EMULSIONS

Cynthia G. Ulbing, Fairport, and Mary Jane W. Brizee, Pittsford, N.Y. (both % Kodak Park, Rochester, N.Y. 14650)

Filed Dec. 12, 1969, Ser. No. 884,703
Int. Cl. G03c *1/28*
U.S. Cl. 96—104
No Drawing. 18 Pages Specification

Photographic silver halide emulsions are spectrally sensitized with a dye combination comprising (1) a benzimidazolonaphthothiacarbocyanine dye and (2) a benzimidazolothiacarbocyanine dye. A preferred dye combination comprises (1) a 4′,5′-benzobenzimidazolothiacarbocyanine dye having the formula:

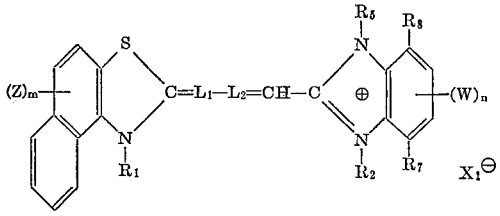

and (2) the benzimidazolothiacarbocyanine dyes having the formula:

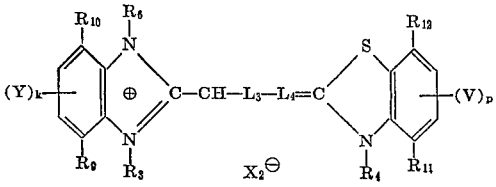

wherein $n$, $k$ and $p$ each represents a positive integer of from 1 to 2; $L_1$, $L_2$, $L_3$, and $L_4$ each represents a methine linkage; $m$ represents a positive integer of from 1 to 4; $R_1$, $R_2$, $R_3$ and $R_4$ each represents an alkyl group; $R_5$ and $R_6$ each represents an unsubstituted lower alkyl group; $R_7$, $R_8$, $R_9$, $R_{10}$, $R_{11}$ and $R_{12}$ each represents a member selected from the group consisting of a hydrogen atom and a halogen atom; $X_1$ and $X_2$ each represents an acid anion; V represents a member selected from the group consisting of a hydrogen atom, a halogen atom, an alkyl group, an alkoxy group and an aryl group; W and Y each represents a member selected from the group consisting of a hydrogen atom, a halogen atom, a cyano group, an alkyl group, an acyl group of a monobasic fatty acid, an alkylaminocarbonyl group, a trifluoroalkyl group and a trifluoroalkylsulfonyl group; and Z represents a member selected from the group consisting of a hydrogen atom, a halogen atom, a sulfo group, an alkyl group, an alkoxy group and an aryl group. A typical example comprises a gelatin silver bromoiodide emulsion containing the dye combination of (1) anhydro-5,6-dichloro-1-ethyl-3-(3-sulfobutyl)-3′-(3-sulfopropyl)-4′,5′-benzobenzimidazolothiacarbocyanine hydroxide and (2) 5,5′,6-trichloro - 1-β-diethylaminoethyl-3,3′-diethylbenzimidazolothiacarbocyanine iodide.